United States Patent Office 3,354,173
Patented Nov. 21, 1967

3,354,173
IMIDAZOLE CARBOXYLATES
Erik Fred Godefroi, Turnhout, and Cyriel Alphons Maria van der Eijcken, Vosselaar, near Turnhout, Belgium, assignors to Janssen Pharmaceutica, N.V., a corporation of Belgium
No Drawing. Filed Apr. 16, 1964, Ser. No. 360,441
7 Claims. (Cl. 260—309)

This invention relates to a new series of organic compounds. More particularly, it is concerned with certain imidazole carboxylates having the formula:

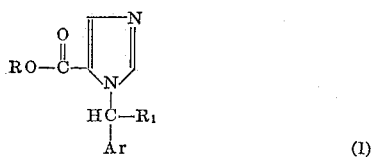

(I)

wherein $R_1$ is lower alkyl, and R is a member selected from the group consisting of lower alkyl, halo-lower alkyl, allyl, 2-propynyl and lower alkoxy-lower alkyl. Ar represents a member selected from the group consisting of phenyl, halophenyl, lower alkylphenyl, lower alkoxyphenyl, thienyl and pyridyl. Said halophenyl, lower alkylphenyl and lower alkoxyphenyl may be mono- or polysubstituted with respect to their halo, lower alkyl and lower alkoxy components. The invention is also concerned with the therapeutically active nontoxic acid addition salts of the foregoing.

As used herein, lower alkyl and lower alkoxy have from 1 to 5 carbon atoms, including straight or branched saturated aliphatic chains, such as, for example, methyl, ethyl, propyl, isopropyl, butyl, isobutyl, tertiary-butyl, pentyl and the like, and the respective methoxy, ethoxy, propoxy, isopropoxy, butoxy, etc.; and halo includes chlorine, bromine, fluorine and iodine.

The compounds of this invention have useful pharmacological properties, for example, they are short-acting hypnotics. They produce at low atoxic dose levels loss of the righting reflex in various animal species, e.g., mice, rats, dogs, cats, sheep, pigs, pigeons and chickens, whereas at the same active dose-level respiration is virtually unaffected. In addition, they are powerful antagonists of many convulsants such as strychnine, pentylenetetrazol, amphetamine, caffeine, etc., and they also antagonize electroseizures. The compounds are also of interest as hypnotics and sedatives in cold-blooded animals as demonstrated by the immobilization of fish at extremely low atoxic concentration.

The compounds of this invention, wherein R is lower alkyl, preferably methyl, may be prepared by the oxidation of 2-mercapto-5-imidazolecarboxylic acid esters (II) with nitric acid according to the procedure for synthesizing 5-imidazole carboxylates outlined by R. G. Jones in J. Am. Chem. Soc., 71, 644 (1949). In the presence of a small amount of alkali nitrite, e.g., sodium nitrite, to initiate the reaction, the nitric acid oxidation may be advantageously conducted at temperatures of 25°–35° C. The resulting desulphurization may be illustrated as follows:

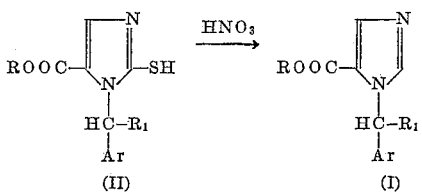

The foregoing 2-mercapto-5-imidazole carboxylic acid esters (II) may be obtained according to methods described in J. Am. Chem. Soc., 71, 644 (1949) and U.S. Pat. No. 2,541,924. In general, said esters are prepared by condensation of an appropriate N-acyl-C-formyl glycine ester enol (III) with hydrogen thiocyanate in an aqueous solution using approximately equivalent molecular quantities of the reactants. Alternatively, condensation may be accomplished with water-soluble metal salts, preferably the alkali metal salt such as sodium, potassium, etc., of one or both of the reactants, such as (IV) below, in which case the reaction is carried out in the presence of a strong, non-oxidizing mineral acid such as hydrochloric acid, hydrobromic acid, phosphoric acid and the like to produce the acid form of the reactants. The condensation solvent is preferably an aqueous solvent such as water or aqueous alcohol containing sufficient water to retain in solution any inorganic salt, which may be produced during the reaction. Although room temperatures (circa 20°–25° C.) are operable, slightly elevated temperatures of about 40°–100° C. will enhance the rate of condensation.

The condensation reactions may be illustrated by the following equations, wherein the acyl group (COR') is a lower aliphatic such as formyl, acetyl, propionyl and the like.

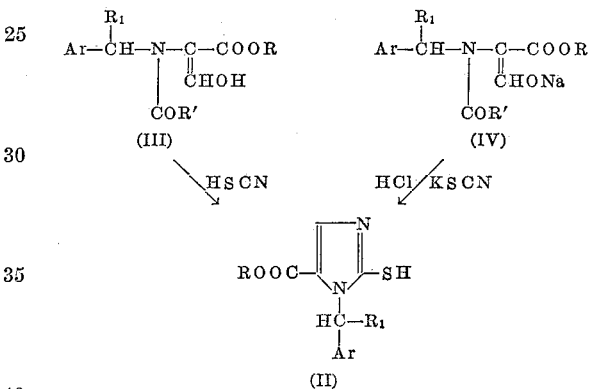

A general outline for preparing the alkali metal enolate salt of N-acyl-C-formylglycine esters (IV) is illustrated as follows. A primary amine bearing the substituent Ar-CH($R_1$)—, wherein Ar and $R_1$ are as heretofore defined, is reacted with a lower alkyl ester of chloroacetic acid, e.g., ethyl chloroacetate, in an inert organic solvent, such as benzene, toluene, 4-methyl-2-pentanone, dimethylformamide, etc., in the presence of a halogen acid acceptor to bind the halogen acid that is liberated during the course of the reaction. Typical halogen acid acceptors include sodium carbonate; organic tertiary amines such as the trialkylamines, e.g., triethylamine, tributylamine, etc.; heterocyclic amines, e.g., N-alkyl piperidine, pyridine, etc.; and dialkyl aromatic amines, e.g., diethyl aniline, dimethyl aniline, etc. The resulting N—[CH($R_1$)Ar]-substituted glycine lower alkyl ester is then acylated in the conventional manner, for example with formic acid to produce the corresponding N—CHO—N—[CH($R_1$)Ar]-substituted glycine ester, or with a lower aliphatic acylating agent such as acetic anhydride, acetyl chloride, propionic anhydride, etc. to produce the corresponding N—acyl—N—[CH($R_1$)Ar]-substituted glycine esters. The N-acylated glycine esters may then be C-formylated using a lower alkyl ester of formic acid, e.g., methyl formate, with an alkali alkoxide, e.g., sodium methoxide, in an inert organic solvent such as benzene, tetrahydrofuran, etc., according to the Claisen method [Ann., 337, 236 (1904)]. To avoid transesterification, glycine esters and formic acid esters derived from the same esterifying lower aliphatic alcohol are preferably used. The resulting alkali metal enolate salt (IV) can be isolated by adding several volumes of ether and filtering off the solid salt. Alternatively, the alkali metal enolate salt need not be isolated but may be extracted with water and the aqueous solution employed as such thereafter. The free N-acyl-C-formyl glycine ester enol (III) can be obtained by acidifying an aqueous solution of the corresponding salt. Isolation of the free enol is effected with a water-immiscible solvent such as chloroform.

The 1—[CH($R_1$)Ar]—5-imidazole carboxylates of this invention, wherein R is halo-lower alkyl, allyl, 2-propynyl and lower alkoxy-lower alkyl, may be prepared from the corresponding lower alkyl imidazole carboxylates. The latter esters are hydrolyzed, preferably with a strong alkali such as sodium or potassium hydroxide, to yield the corresponding imidazole carboxylic acids. Conversion of the acid to the corresponding imidazole carboxylic acid halide is suitably effected by treatment with a sulfur or phosphorous oxyhalide as, for example, phosphorous-oxychloride or, preferably, thionyl chloride. Due to the hydrogen halide liberated during the course of the reaction, the 1—[CH($R_1$)Ar]—5-imidazole carboxylic acid halide is obtained as the hydrohalide salt. The salt may advantageously be used as such without conversion to the base form in the subsequent reaction step, in which case, the final product is also obtained in salt form. The resulting imidazole carboxylic acid halide is then reacted with the appropriate alcohol, e.g., a halo-lower alkanol, allyl alcohol, propargyl alcohol and lower alkoxy-lower alkanol, preferably under reflux conditions, to yield the corresponding halo-lower alkyl, allyl, 2-propynyl and lower alkoxy-lower alkyl esters, respectively, of 1—[CH($R_1$)Ar]—5-imidazole carboxylic acid. The acid halide may, of course, be reacted with lower alkanol to yield the corresponding lower alkyl ester, thereby providing a method for exchanging the esterifying alkyl groups from one to another.

Depending upon the conditions employed during the course of the reactions, the novel compounds of this invention are obtained either in the form of the free bases or salts thereof. The salts are converted to the free bases in the usual manner, e.g., by reaction with alkali such as sodium or potassium hydroxide. The compounds in base form may be converted to their therapeutically useful acid addition salts by reaction with an appropriate acid, as, for example, an inorganic acid such as a hydrohalic acid, i.e. hydrochloric, hydrobromic or hydriodic acid; sulfuric, nitric or thiocyanic acid; a phosphoric acid; an organic acid such as acetic, propionic, glycolic, lactic, pyruvic, oxalic, malonic, succinic, maleic, fumaric, malic, tartaric, citric, benzoic, cinnamic, mandelic, methanesulfonic, ethanesulfonic, hydroxyethanesulfonic, p-toluenesulfonic, salicyclic, p-aminosalicylic, 2-phenoxybenzoic or 2-acetoxy benzoic acid.

The following examples are intended to illustrate, but not to limit, the scope of the present invention. Unless otherwise stated, all parts are by weight.

*Example I*

To a mixture of 132 parts dl-1-phenyl-ethylamine, 110 parts triethylamine and 100 parts dimethylformamide are added 133.5 parts ethyl chloroacetate (exothermic reaction: temperature rises from 10° to 50° C.). After the addition is complete, the whole is stirred overnight at a temperature of 45° C. The reaction mixture is then diluted with 800 parts anhydrous ether, whereupon a precipitate is formed. It is filtered off (mainly triethylamine hydrochloride) and the filtrate is washed four times with water. The organic layer is dried over magnesium sulfate, filtered and evaporated, yielding dl-N-[(ethoxycarbonyl)-methyl]-1-phenyl-ethylamine as a residue. This product is heated to reflux together with 55.2 parts formic acid and 480 parts xylene. After the calculated amount of water and formic acid are separated, the mixture is cooled and extracted successively with water, formic acid 20%, water, a sodium hydrogen carbonate solution and again with water. The organic layer is then separated, dried over magnesium-sulfate, filtered and evaporated. The oily residue is distilled in vacuo, to yield dl-N-formyl-N-[(ethoxycarbonyl)-methyl]-1-phenyl-ethylamine (B.P. 165–170° C. at 3 mm. pressure). 29.9 parts of a sodium dispersion 50% in pariffin oil are added to 300 parts tetrahydrofurane and the whole is slowly heated to a temperature of 40° C., while stirring. While maintaining this temperature, there is added a solution of 16 parts methanol and 75 parts tetrahydrofurane. After the addition is complete, the whole is stirred at 40° C. for 1 hour. After cooling to 10° C., there is added at once a mixture of 144 parts dl-N-formyl-N-[(ethoxycarbonyl)-methyl]-1-phenyl ethylamine in 108 parts methyl formate. The whole is stirred overnight at room temperature. The mixture is evaporated in vacuo. To the residue are added 800 parts ether followed by 700 parts water. The aqueous layer is separated and diluted to a volume of 1000 parts. Then there are added 114 parts concentrated hydrochloric acid. The whole is heated to 40° C. and stirred at this temperature for 15 minutes. Then there is added dropwise a solution of 90 parts potassium thiocyanate in an equal volume of water. After the addition is complete, the whole is further stirred for 3 hours at 40° C., followed by stirring overnight at room temperature. The aqueous phase is distilled off and the oily residue solidifies on stirring. This solid is triturated in ice-cold methanol previously diluted with 15% water. The solid is filtered off, washed with diisopropylether and recrystallized once more from a mixture of methanol and water, treated with activated charcoal. After boiling for a few minutes, the whole is filtered hot and after cooling the filtrate for 3 hours at room temperature, the solid is filtered off yielding [dl-1-(1 - phenyl - ethyl)-2-mercapto-5 (methoxy-carbonyl)-imidazole]; M.P. 131–134° C.

To a mixture of 80 parts nitric acid (d: 1.37) and 200 parts water are added 0.5 part sodium nitrite at a temperature of about 25° C. While keeping the temperature at about 35° C., there are added portionwise 66 parts dl-1-(1-phenyl-ethyl)-2-mercapto-5-(methoxy-carbonyl)-imidazole. After the addition is complete, the whole is cooled to room temperature. Then the solution is alkalized by addition of sodium carbonate while stirring. The mixture is extracted with ether. The organic layer is separated, dried over magnesium sulfate and filtered. To the filtrate is added 2-propanol, previously saturated with gaseous hydrogen chloride. The formed precipitate is filtered off and dissolved in boiling methanol. Anhydrous ether is added until a turbid solution is obtained and the whole is kept overnight at room temperature. Then the precipitate is filtered off and dried in vacuo, yielding dl-1-(1-phenyl-ethyl)-5-methoxy-carbonyl)-imidazole hydrochloride; M.P. 173–174° C.

*Example II*

A mixture of 145 parts dl-1-phenyl-propylamine, 200 parts dimethylformamide (technical grade) and 150 parts triethylamine is cooled to 0° C. and at this temperature there are added 178 parts ethyl chloroacetate. A slightly exothermic reaction occurs. The mixture is stirred overnight whereupon the precipitated triethylammonium-chloride is filtered off. Then 700 parts diethylether are added and the obtained solution is washed repeatedly with water. After drying, the organic solution is evaporated, leaving about 270 parts of an oily residue. To this are added 900 parts xylene, followed by 67 parts formic acid. The reaction mixture is heated to reflux and the formed water is removed by azeotropic distillation. After cooling, the solution is washed first with 20% aqueous formic acid solution and then it is neutralized by washing with saturated sodium bicarbonate solution. After drying, the solvent is evaporated and the residue is fractionated in vacuo to yield dl-N-[(ethoxy-carbonyl)-methyl]-N-(1-phenyl-propyl)-formamide; B.P. 147–157° C. at 2 mm. pressure.

To 25.3 parts of a 50% sodium-benzene dispersion in 180 parts tetrahydrofurane is added a mixture of 17 parts methanol in 45 parts tetrahydrofurane. After the sodium has reacted, the obtained slurry is cooled to 0° C. and to it is added, at once, a solution of 130 parts dl-N-[(ethoxy-carbonyl)-methyl]-N-(1-phenyl-propyl)-formamide in 100 parts methyl formate. The whole is stirred overnight, whereupon the solvent is distilled off. The residue is diluted with 600 parts water and the undissolved oil is removed by extraction with ether. To the aqueous phase are added 100 parts concentrated hydrochloric acid, followed by 400 parts methanol. The temperature is raised to 40° C. and kept there for 30 minutes. Then a solution of 58 parts potassium thiocyanate in 100 parts water is added. The whole is then stirred without heating. After about 2 hours, the solution becomes cloudy and after about 4 hours crystallization sets in. The whole is stirred overnight and the precipitated solid is filtered off and dried to yield dl-1-(1-phenyl-propyl)-2-mercapto-5-(methoxy-carbonyl)-imidazole. Recrystallization of a sample of dl-1-(1-phenyl-propyl)-2-mercapto-5-(methoxy-carbonyl)-imidazole from 50 parts of a 1:1 mixture water-dimethylformamide yields dl-1-(1-phenyl-propyl)-2-mercapto-5-(methoxy-carbonyl)-imidazole; M.P. 209–210° C.

5 parts dl-1-(1-phenyl-propyl)-2-mercapto-5-(methoxy-carbonyl)-imidazole are added portionwise to a solution of 6.9 parts nitric acid ($d$: 1.37) in 13 parts water, containing about 0.1 part sodium nitrite. During this addition the temperature is kept at 30–40° C. by external cooling. The whole is then stirred for about 30 minutes at room temperature. An oil is precipitated, which, even after cooling to 0° C. does not solidify. The reaction mixture is then alkalized by addition of solid sodium carbonate and the whole is extracted with ether. This extract is dried and a solution of gaseous hydrogen chloride in 2-propanol is added. The precipitated hydrochloride is filtered off to yield dl-1-(1-phenyl-propyl)-5-(methoxy-carbonyl)-imidazole hydrochloride, which after recrystallization from a mixture of 16 parts 2-propanol and 42 parts diethylether, has a M.P. of 167–168.5° C.

*Example III*

To a mixture of 191 parts dl-1-phenyl-butyl-amine, 129.2 parts triethylamine and 200 parts dimethylformamide, at a temperature of about 20° C. are added at once 156.8 parts ethyl chloroacetate. (Slightly exothermic reaction; temperature rises to 40° C. after one hour.) The temperature is kept at about 35° C. by means of a water-bath for about 90 minutes. Then the mixture is stirred overnight at room temperature. There is added anhydrous ether and the reaction mixture is filtered. The filtrate is washed with water (4×) and the organic layer is dried over magnesium sulfate, filtered and evaporated, yielding a residue. This residue together with 66 parts formic acid and 360 parts xylene is refluxed for 4 hours. (Reaction vessel is provided with reflux-condenser and water-separator.) After the calculated amount of water is separated, the reaction mixture is cooled and washed with: respectively: a 20% formic acid solution and water. The organic layer is separated and washed once more with sodium bicarbonate. Thereafter, the organic layer is washed again with water (2×), dried over magnesium sulfate, filtered and evaporated in vacuo. The residue is distilled to yield dl-N-[(ethoxy-carbonyl)-methyl]-N-(1-phenyl-butyl)-formamide: B.P. 185–188° C. at 3–4 mm. pressure.

23.46 parts of a 50% sodium suspension in benzene is added to 600 parts anhydrous tetrahydrofurane. The obtained mixture is stirred and heated to about 40° C. Then a solution of 16.3 parts methanol in 45 parts tetrahydrofurane is added portionwise. After the addition is complete, stirring is continued for 1 hour. Then a mixture of 131.5 parts dl - N - [(ethoxy - carbonyl)-methyl]-N-(1-phenyl-butyl)-formamide and 90 parts methyl formate is added at once, (slightly exothermic reaction: temperature rises from 20 to 28° C.) and the whole is stirred overnight. The reaction mixture is then evaporated in vacuo and the residue is divided between 700 parts ether and 600 parts water. The aqueous layer is separated and 400 parts methanol and 112 parts concentrated hydrochloric acid are added. The whole is heated to 40° C. and a solution of 73.5 parts potassium thiocyanate in 70 parts water are added. The whole is stirred overnight at room temperature and is then filtered. The filter cake is washed with diisopropylether and dried at the air. A sample of the obtained solid is recrystallized from boiling methanol. Water is added to the solution until a turbid solution is obtained. After keeping for 3 hours at room temperature, the formed precipitate is filtered off and dried in vacuo to yield dl-1-(1-phenyl-butyl)-2-mercapto-5-(methoxy-carbonyl)-imidazole; M.P. 175–177° C.

To a mixture of 14.5 parts nitric acid, 37 parts water and 0.1 part sodium nitrite, heated to about 25° C. are added portionwise 10 parts dl-1-(1-phenyl-butyl)-2-mercapto-5-(methoxy - carbonyl) - imidazole, while stirring. Slightly exothermic reaction: temperature rises to about 35° C. After the addition is complete, the whole is stirred for 1 hour at the same temperature. The formed precipitate is filtered off and it is dissolved in 150 parts hot water. The solution is then alkalized by addition of solid sodium carbonate (pH 10), whereupon an oil is separated. After cooling, the reaction mixture is extracted with ether. This extract is dried over magnesium sulfate and a solution of gaseous hydrogen chloride in 2-propanol is added. The formed precipitate is filtered off and recrystallized from about 16 parts hot 2-propanol. Anhydrous ether is added to the solution until turbid. After cooling to room temperature, the solid is filtered off and dried in vacuo at 40° C., yielding dl-1-(1-phenyl-butyl) 5-(methoxy - carbonyl) - imidazole hydrochloride; M.P. 150.5–152° C.

*Example IV*

To a mixture of 63 parts of dl-1-(4-fluoro-phenyl) ethylamine in 75 parts dimethylformamide and 43.4 parts triethylamine are added 57.6 parts ethyl chloroacetate at a temperature of 43° C. (Exothemic reaction: after an hour, the temperature reaches 65° C. and is brought to 40° C.). The mixture is stirred overnight at room temperature. Then 480 parts ether are added and the precipitated triethylamine hydrochloride is filtered off. The filtrate is washed with water (4× 100 parts), dried and evaporated. The residue is dissolved in 450 parts xylene and there are added 22.8 parts formic acid. The water is separated by azeotropic distillation (about 2 hours). After cooling, the reaction mixture is washed thoroughly respectively with 20% formic acid, water and sodium bicarbonate. After drying, the mixture is evaporated. The residue is distilled to yield dl-N-[(ethoxy-carbonyl)-methyl] - N - [1 - (4-fluoro-phenyl)-ethyl]-formamide; B.P. 185–192° C. at 8 mm. pressure.

12.8 parts of a 50% sodium suspension in benzene is added to 150 parts tetrahydrofurane. The obtained mixture is stirred and heated to about 40° C. Then a solution of 8.7 parts methanol in 30 parts tetrahydrofurane is added dropwise. After the addition is complete, the mixture is cooled to 0° C. and a solution of 68 parts dl-N-[(ethoxy-carbonyl)-methyl] - N - [1 - (4-fluoro-phenyl) ethyl]-formamide, in 48 parts methyl formate, is added. The whole is stirred for 30 minutes at 0° C. and further overnight at room temperature. Then the reaction mixture is evaporaed and 300 parts water are added to the residue and the solution is washed with ether. To the aqueous phase are added 57.6 parts hydrochloric acid and the mixture is heated to 40° C. At this temperature, there are added 240 parts methanol and the mixture is kept at 40° C. for 30 minutes. Then a solution of 29 parts potassium thiocyanate in 50 parts water is added and the whole is stirred overnight, whereupon an oil is precipitated, which solidifies on scratching in 2-propanol. The formed solid is filtered off yielding a first fraction of crude dl-1-[1-(4-fluoro-phenyl)-ethyl]-2-mercapto - 5 - (methoxy-carbonyl)-imidazole. Water is added to the filtrate, whereupon an oil precipitates, which solidifies on keeping at room temperature. The formed solid is filtered off to yield a second fraction of crude dl-1-[1-(4-fluoro-phenyl) ethyl]-2-mercapto - 5 - (methoxy-carbonyl)-imidazole. A sample of 4 parts of the combined fractions is recrystallized from 24 parts methanol (50%), to yield pure dl-1- [1-(4-fluoro-phenyl - ethyl] - 2 - mercapto-5-(methoxy-carbonyl)-imidazole; M.P. 134–136° C.

To a mixture of 13.7 parts nitric acid in 30 parts water and 0.2 part sodium nitrite are added portionwise 10 parts dl-1-[1-(4-fluoro-phenyl) - ethyl] - 2 - mercapto-5-(methoxy-carbonyl)-imidazole while stirring at a temperature between 33 and 38° C. After the addition is complete, the whole is further stirred for 30 minutes. After cooling to 0° C., the formed precipitate is filtered off and washed with water. It is then dissolved in 30 parts water at 50° C. The solution is boiled with solid sodium carbonate. After cooling, the mixture is extracted with ether, dried and filtered. 2-propanol, previously saturated with gaseous hydrogen chloride is added to the filtrate. The precipitated hydrochloride is filtered off and recrystallized from a mixture of 8 parts 2-propanol and 140 parts ether, yielding dl-1-[1-(4-fluoro-phenyl)-ethyl]-5-(methoxy-carbonyl)-imidazole hydrochloride; M.P. 174–175.5° C.

Example V

To a stirred mixture of 169.6 parts dl-1-(2-chloro-phenyl)-ethylamine and 80 parts dimethylformamide are added successively 110 parts triethylamine and 133 parts ethyl chloroacetate at a temperature between 30 and 35° C. After the addition is complete, the mixture is stirred overnight at room temperature. Then there are added 800 parts anhydrous ether, whereupon triethylamine hydrochloride is precipitated. It is filtered off and the filtrate is washed four times with 100 parts water. The organic layer is dried over magnesium sulfate and evaporated, yielding crude dl-N-[(ethoxy-carbonyl)-methyl]-1-(2-chlorophenyl)-ethylamine as an oily residue. This oily residue is stirred and refluxed for 3 hours together with 55.2 parts formic acid and 480 parts xylene. (The reaction-vessel is provided with reflux-condenser and water-separator.) After the calculated amount of water is separated, the mixture is cooled and washed successively three times with 100 parts formic acid 20%, twice with 100 parts water, once with 100 parts sodium hydrogen carbonate solution and twice with 80 parts water. The organic layer is separated, dried over sodium sulfate and evaporated. The oily residue is distilled in vacuo, to yield dl-N-[(ethoxy-carbonyl)-methyl]-N-[1-(2-chlorophenyl)-ethyl]-formamide; B.P. 154–160° C. at 0.4 mm. pressure.

To 29.9 parts of a 50% sodium-benzene dispersion in 450 parts tetrahydrofurane is added dropwise a solution of 20.8 parts methanol in 50 parts tetrahydrofurane in the course of about 45 minutes. The whole is stirred for 30 minutes at room temperature. Then there is added at once a solution of 164.5 parts dl-N-[(ethoxy-carbonyl)-methyl]-N-[1-(2-chloro-phenyl)-ethyl]-formamide in 108 parts methyl formate at a temperature of 15° C. (slightly exothermic reaction: temperature rises to 30° C.). After stirring overnight at room temperature, the solvent is evaporated in vacuo. The oily residue is dissolved in 600 parts water. The solution is washed with 160 parts diisopropyl-ether. The aqueous layer is separated and stirred for 30 minutes at about 40° C. together with 480 parts methanol and 114 parts concentrated hydrochloric acid. While keeping the temperature at 40° C. there is added at once a solution of 90 parts potassium thiocyanate in 200 parts water. The mixture is stirred for 30 minutes at the same temperature, whereafter a white solid is precipitated. After further stirring overnight at room temperature, the solid is filtered off, washed on the filter with cold methanol and dried in vacuo, yielding crude dl-1-[1-(2-chloro-phenyl) - ethyl]-2-mercapto-5-(methoxy-carbonyl)-imidazole. A sample of this crop is recrystallized from 72 parts methanol, yielding dl-1-[1-(2-chloro-phenyl)-ethyl]-2-mercapto-5-(methoxy-carbonyl)-imidazole; M.P. 183.5–186.5° C.

To a stirred mixture of 22 parts nitric acid ($d = 1.4$), 40 parts water and 0.5 part sodium nitrite are added portionwise 14.8 parts dl-1-[1-(2-chlorophenyl)-ethyl]-2-mercapto-5-(methoxy-carbonyl)-imidazole in the course of about 30 minutes and at a temperature of 35° C. After the addition is complete, the mixture is further stirred for 30 minutes at room temperature, whereupon a solid is precipitated. It is filtered off, washed with cold water and then dissolved in about 100 parts warm water. To this solution is added solid sodium carbonate. After extraction with ether (several times), the combined extracts are dried over magnesium sulfate, filtered and to the filtrate is added 2-propanol which is previously saturated with gaseous hydrogen chloride. The precipitated salt is filtered off and dried in vacuo, yielding crude dl-1-[1-(2-chloro-phenyl)-ethyl]-5-(methoxy-carbonyl)-imidazole hydrochloride. This crop is recrystallized from a mixture of methanol and anhydrous ether, yielding dl-1-[1-(2-chloro-phenyl) - ethyl]-5-(methoxy-carbonyl)-imidazole hydrochloride; M.P. 181–183° C.

Example VI

A mixture of 309.2 parts 3-chloro-acetophenone, 504.4 parts ammonium formate and 100 parts formic acid is heated while stirring at a temperature range of 140–185° C. (the reaction vessel is provided with a distillation-set). After three hours the oily layer is separated from the distillate and added to the reaction mixture. The whole is heated again until no more oil is distilled. During this treatment the distillate must be kept acid and therefore there is added periodically a few parts of formic acid. After cooling the reaction mixture, there is added 2500 parts water. The oily layer is separated and the aqueous layer is extracted twice with benzene. The combined organic layers are evaporated. To the residue are added 275 parts concentrated hydrochloric acid, and the whole is stirred and refluxed for 1.5 hours. After cooling, the mixture is washed with 160 parts benzene. The aqueous layer is alkalized with sodium hydroxide solution and extracted several times with benzene. The combined extracts are dried over magnesium sulfate and evaporated in vacuo. The oily residue is distilled in vacuo, yielding dl-1-(3-chlorophenyl)-ethylamine; B.P. 105° C. at 12 mm. pressure.

To a stirred mixture of 169.6 parts dl-1-(3-chloro-phenyl)-ethylamine in 100 parts dimethylformamide are added successively 77 parts triethylamine and 133 parts ethyl chloroacetate at a temperature between 30 and 35° C. After the addition is complete, the whole is stirred overnight at room temperature. Then there is added 800 parts anhydrous ether, whereupon the white precipitate is filtered off (mainly triethylamine hydrochloride). The filtrate is washed four times with 100 parts water, dried over magnesium sulfate and evaporated. The yellow oily residue (dl-N-[(ethoxy-carbonyl) - methyl]-1-(3-chlorophenyl)-ethylamine) is stirred and refluxed for 4 hours together with 55.2 parts formic acid and 480 parts xylene. (This reaction vessel is provided with a reflux-condensor and a water-separator.) After the calculated amount of water is evolved, the mixture is cooled and washed successively by the addition of 3× 100 parts 20% formic acid, 1× 100 parts water, 2× 100 parts sodium hydrogen carbonate solution and finally 2× 100 parts water. The organic layer is dried over magnesium sulfate and evaporated. The oily residue is distilled in vacuo, to yield dl-N - [(ethoxy-carbonyl)-methyl]-N-[1-(3-chloro-phenyl)-ethyl]-formamide; B.P. 160–166° C. at 0.22 mm. pressure.

To 29.9 parts of a 50% sodium-benzene dispersion in 360 parts tetrahydrofurane is added a solution of 20.8 parts methanol in 45 parts tetrahydrofurane. After the addition is complete, there is added at a temperature of 15° C., a mixture of 164.5 parts dl-N-[(ethoxy-carbonyl)-methyl] - N-[1-(3-chloro-phenyl)-ethyl]-formamide, and 108 parts methyl formate. The whole is stirred overnight at room temperature, whereafter the tetrahydrofurane is evaporated in vacuo. The oily residue is divided between 600 parts water and 160 parts diisopropylether. The aqueous layer is stirred with a solution of 114 parts concentrated hydrochloric acid in 480 parts methanol at a temperature of 40° C. for 30 minutes. Then there is added a solution of 90 parts potassium thiocyanate in 200 parts water. After the addition is complete, the whole is stirred overnight at room temperature whereupon a white precipitate is filtered off (filtrate is set aside). The solid is stirred with 160 parts methanol and filtered off again, to yield after drying in vacuo crude dl-1-[1-(3-chloro-phenyl)-ethyl]-2-mercapto-5-(methoxy-carbonyl)-imidazole. A sample of this crop is recrystallized from a mixture of methanol and petroleum ether, yielding pure dl-1-[1-(3-chloro - phenyl) - ethyl]-2-mercapto-5-(methoxy-carbonyl)-imidazole; M.P. 178.5–180.5° C. On stirring the mother liquor (filtrate which was set aside—see above) for 2 days at room temperature, a second fraction of less pure dl - 1 - [1 - (3 - chloro-phenyl)-ethyl]-2-mercapto-5-(methoxy-carbonyl)-imidazole is obtained: M.P. 170–173° C.

To a stirred mixture of 22.4 parts nitric acid ($d=1.4$), 40 parts water and 0.5 part sodium nitrite are added portionwise 14.8 parts dl-1-[1-(3-chloro-phenyl)-ethyl]-2-mercapto-5-(methoxy-carbonyl)-imidazole, at a temperature of 28–33° C. (duration time: 30 minutes). After the addition is complete, the whole is stirred for an additional hour at room temperature. The mixture is alkalized with solid sodium carbonate and then extracted with ether. The extract is dried over magnesium sulfate, filtered and to the filtrate is added 2-propanol which is previously saturated with gaseous hydrogen chloride. The precipitated salt is filtered off and dried. After recrystallization from a mixture of methanol and anhydrous ether, dl-1-[1-(3-chloro - phenyl)-ethyl]-5-(methoxy-carbonyl)-imidazole hydrochloride is obtained; M.P. 151–153.5° C.

*Example VII*

To a mixture of 186 parts dl-α-methyl-4-chloro-benzylamine, 164 parts triethylamine and 250 parts dimethylformamide is added at once 112 parts ethyl chloroacetate while stirring (exothermic reaction; the temperature reaches 45° C. after 2 hours). The whole is stirred overnight. The reaction mixture is diluted with 560 parts ether, whereupon a precipitate is formed. It is filtered off (mainly triethylamine hydrochloride) and the filtrate is washed 4 times with water. The organic layer is dried over magnesium sulfate and evaporated, yielding dl-α-methyl-N - [(ethoxy-carbonyl)-methyl]-4-chloro-benzylamine as a residue. This product is heated to reflux, together with 60 parts formic acid and 630 parts xylene. After the calculated amount of water and formic acid are separated, the mixture is cooled and extracted successively with formic acid 20%, water and a sodium hydrogen carbonate solution 5%. The organic layer is then separated, dried over magnesium sulfate and evaporated. The oily residue is distilled in vacuo, to yield oily dl-α-methyl-N-[(ethoxy-carbonyl)-methyl] - N-formyl-4-chloro-benzylamine; B.P. 170–173° C. at 4 mm. pressure. 34.5 parts of a dispersion of sodium in paraffin oil (50%) are added to 360 parts tetrahydrofurane and the mixture is heated to boiling temperature. To this are added dropwise a solution of 23 parts methanol in 90 parts tetrahydrofurane. After the addition is complete, the whole is cooled to 5° C. and there is added at once a mixture of 187 parts dl-α-methyl-N - [(ethoxy-carbonyl)-methyl]-N-formyl-4-chloro-benzlamine and 122 parts methylformate. The whole is stirred for one hour in an ice-bath, followed by stirring overnight at room temperature. The whole is evaporated. To the residue are added 800 parts water and the mixture is washed with ether. To the aqueous layer are added 800 parts methanol and then 53 parts hydrochloric acid. The whole is heated to 40° C. and kept at this temperature for 30 minutes. Thereafter, a solution of 73 parts potassium thiocyanate in 150 parts water is added slowly. An exothermic reaction occurs and after the addition is complete, a temperature of about 40° C. is maintained for several hours, without applying external heating, during which an oil is precipitated. The mixture is stirred overnight at room temperature and the precipitated oil solidifies on scratching. The solid is filtered off and is recrystallized from a mixture of 40 parts methanol and 50 parts water, yielding dl-1-[1-(4-chloro-phenyl)ethyl]-2-mercapto-5-(methoxy-carbonyl)-imidazole; M.P. 161–162° C.

To a mixture of 21 parts nitric acid, 41 parts water and 0.2 part sodium nitrite are added portionwise 15 parts dl - 1 - [1-(4-chloro-phenyl)-ethyl]-2-mercapto-5-(methoxy-carbonyl)-imidazole at 25° C. (Exothermic reaction; temperature is kept at 30–38° C. by means of an ice-bath). After the addition is complete, the whole is stirred for about one hour, whereupon an oil is precipitated. The mixture is alkalized with sodium carbonate and the whole is boiled for about one minute. After cooling, the reaction mixture is extracted 3 times with ether. The combined organic layers are dried and 2-propanol, previously saturated with gaseous hydrogen chloride, is added. The precipitated hydrochloride is filtered off and recrystallized from 24 parts methanol and 140 parts ether, yielding dl-1-[1-(4-chloro-phenyl)-ethyl]-5-methoxy-carbonyl)-imidazole hydrochloride; M.P. 147–148° C.

*Example VIII*

To a mixture of 316 parts dl-1-(4-bromo-phenyl)-ethylamine, 159.8 parts of triethylamine and 210 parts dimethylformamide are added at once 193.5 parts ethyl chloroacetate. The mixture is stirred overnight at room temperature. Then about 700 parts anhydrous ether are added. The formed precipitate is filtered off and discarded. The filtrate is washed 4 times with 100 parts water. The organic layer is separated, dried over magnesium sulfate, filtered and evaporated, yielding 403 parts of an oily residue. A mixture of the obtained residue, 69 parts formic acid and 450 parts xylene is stirred and refluxed for 3 hours. (Reaction vessel is provided with reflux-condensor and water separator.) After the calculated amount of water is separated, the reaction mixture is cooled and then washed successively with water, 20% acetic acid, water, sodium bicarbonate solution and once more with water. The organic layer is separated, dried over magnesium sulfate, filtered, concentrated and distilled in vacuo, yielding dl-N - [(ethoxy-carbonyl)-methyl] -N - [1-(4-bromo-phenyl)-ethyl]-formamide; B.P. 184–200° C. at 2 mm. pressure.

23.46 parts of a 50% sodium suspension in benzene is added to 450 parts anhydrous tetrahydrofurane. The obtained mixture is stirred and it is heated to about 40° C. Then a mixture of 16.32 parts methanol in 45 parts tetrahydrofurane is added dropwise. After the addition is complete, stirring is continued for about 2 hours at room temperature, whereupon the whole is cooled to 10° C. At this temperature a mixture of 157 parts dl-N-[(ethoxy-carbonyl) - methyl]-N-[1-(4-bromo-phenyl)-ethyl]-formamide and 90 parts methyl formate is added (temperature rises to 23° C.) and the whole is stirred overnight at room temperature. Then the reaction mixture is evaporated in vacuo and the residue is divided between 700 parts ether and 600 parts water. The aqueous layer is separated; and 480 parts methanol and 112.2 parts concentrated hydrochloric acid are added successively. The temperature rises to about 35° C. The mixture is stirred for 10 minutes and then a solution of 73.5 parts potassium thiocyanate in 70 parts water is added. The whole is stirred overnight at a temperature of about 30° C. The formed precipitate is filtered off, triturated in a small volume of methanol, filtered off again and dried to yield dl-[1-(4-bromo-phenyl)ethyl] - 2 - mercapto - 5 - (methoxy-carbonyl)-imidazole. A sample is recrystallized from a mixture of methanol and water. After keeping overnight at room temperature, the precipitate is filtered off and dried in vacuo for 24 hours at 70° C., to yield dl-[1-(4-bromo-phenyl)ethyl]-2-mercapto-5-(methoxy-carbonyl)-imidazole; M.P. 157–161° C.

A mixture of 15.4 parts nitric acid, 37 parts water and 0.2 part sodium nitrite is heated to 30° C. Then, 10 parts dl-[1-(4-bromo-phenyl) - ethyl] - 2 - mercapto - 5 - (methoxycarbonyl)-imidazole are added portionwise, while maintaining the temperature between 30 and 38° C. After the addition is complete, and no more nitrogen dioxide is evolved, the reaction mixture is alkalized by addition of solid sodium carbonate and the whole is extratced with ether. The organic layer is separated, dried over magnesium sulfate and filtered. A saturated solution of hydrogen chloride in 2-propanol is added to the filtrate,whereupon an oil is precipitated, which solidifies on scratching in anhydrous ether. The precipitate is filtered off. It is crystallized from 2-propanol. To the solution is added anhydrous ether until a turbid solution is obtained. After keeping for 3 hours at room temperature, the solid is filtered off and dried overnight in vacuo at 40° C., yielding dl-1-[1-(4-bromo-phenyl) - ethyl] - 5 - (methoxy-carbonyl)-imidazole hydrochloride; M.P. 137–139° C.

*Example IX*

To a mixture of 174 parts dl-1-(4-methyl-phenyl)-ethylamine, 129 parts triethyl amine and 200 parts dimethylformamide are added at once 156.8 parts ethyl chloroacetate. The temperature rises to 35° C. and is kept there for some minutes. The mixture is then stirred overnight and anhydrous ether is added to the reaction mixture. The precipitated triethylamine hydrochloride is filtered off and the filtrate is washed with water 4 times. The organic layer is separated, dried over magnesium sulfate and evaporated. The residue, together with 66.2 parts formic acid and 360 parts xylene are refluxed for 4 hours. (Reaction vessel is provided with reflux-condensor and water-separator.) After the calculated amount of water is separated, the reaction mixture is cooled and washed respectively with 20% formic acid and water. Then solid sodium carbonate is added while stirring until no more carbon dioxide gas is evolved. After washing the organic solution twice with water, it is dried over magnesium sulfate and evaporated. The residue is distilled in vacuo to yield dl - N - [(ethoxy-carbonyl) - methyl] - N - [1 - (4-methyl-phenyl)-ethyl]-formamide; B.P. 183–185° C. at 4–5 mm. pressure.

23.46 parts of a 50% sodium suspension in benzene are added to 525 parts of anhydrous tetrahydrofurane. The obtained mixture is stirred and heated to about 40° C. Then a solution of 16.32 parts methanol in 45 parts tetrahydrofurane is added dropwise. After the addition is complete, stirring is continued for 2 hours at room temperature. Then a mixture of 124.5 parts dl-N-[(ethoxy-carbonyl) - methyl] - N - [1-(4-methyl-phenyl)-ethyl]-formamide and 90 parts methyl formate is added at once (slightly exothermic reaction; temperature rises to 27° C.) and the whole is stirred overnight at room temperature. Then the reaction mixture is evaporated in vacuo and the residue is divided between 700 parts ether and 500 parts water. The aqueous layer is separated and 112.2 parts concentrated hydrochloric acid are added to it. After stirring for 10 minutes, a solution of 73.5 parts potassium thiocyanate in 70 parts water are added, and the mixture is further stirred for 2 days at room temperature. The formed precipitate is filtered off and dried to yield crude dl - 1 - [1-(4-methyl-phenyl)-ethyl] - 2 - mercapto - 5 - (methoxy-carbonyl)-imidazole. A sample thereof is recrystallized from boiling methanol. Water is added to the boiling solution until turbid. After cooling to room temperature, the formed precipitate is filtered off and dried in vacuo at 70° C., to yield dl-[1-(4-methyl-phenyl)-ethyl] - 2 - mercapto - 5 - (methoxy-carbonyl)-imidazole; M.P. 163–165° C.

To a mixture of 11 parts nitric acid, 37 parts water and 0.1 part sodium nitrite are added 10 parts dl-1-[1-(4-methyl-phenyl)-ethyl] - 2 - mercapto - 5 - (methoxy-carbonyl)-imidazole portionwise, while stirring. The initial temperature (about 25° C.) rises to 35° C. This temperature is maintained, until the addition is complete. Then the formed precipitate is filtered off and dissolved in 200 parts boiling water. The solution is filtered and the filtrate is alkalized with solid sodium carbonate, whereupon an oil precipitates. The mixture is extracted with ether. The ether extract is dried over magnesium sulfate, filtered and 2-propanol, previously saturated with gaseous hydrogen chloride, is added to the filtrate. The precipitated hydrochloride is filtered off and it is dissolved in 2-propanol; the mixture is boiled for awhile and then about a twenty-fold of anhydrous ether is added. After keeping for 3 hours at room temperature, the formed precipitate is filtered off and dried overnight at 50° C., to yield dl-1-[1-(4-methyl-phenyl)-ethyl]-5-(methoxy-carbonyl)-imidazole hydrochloride; M.P. 167–168° C.

*Example X*

A mixture of 593 parts 3,4-dimethyl-acetophenone, 1010 parts ammonium formate and 180 parts formic acid is distilled under stirring. In the course of about 3½ hours a distillate is collected boiling between 142° and 184° C. The distillate gives two layers from which the organic layer (unreacted 3,4-dimethyl-acetophenone) is returned to the distillaiton flask. This distillation process is repeated about 6 times until no more acetophenone distills. During this time, fresh formic acid is added occasionally in order to maintain an acid reaction of the reaction mixture. After cooling, 3 l. water are added to the reaction mixture. The aqueous layer is separated and extracted twice with benzene. The extracts are added to the organic layer and from the combined solutions the solvent is distilled off. To the residue are added 500 parts concentrated hydrochloric acid and the whole is refluxed for about 90 minutes. After washing the cooled reaction mixture with benzene, it is alkalized with concentrated sodium hydroxide solution. The separated oil is extracted with benzene, dried over sodium sulfate and evaporated. The residue is fractionated in vacuo yielding dl-1-(3,4-dimethyl-phenyl) ethylamine; B.P. 70–73° C. at .7 mm. pressure.

To a mixture of 162.6 parts dl-1-(3,4-dimethyl-phenyl)-ethylamine, 110 parts triethylamine and 100 parts dimethylformamide are added at once 133 parts ethyl chloroacetate. The temperature rises slowly to 35° C. and is kept at 30–35° C. by means of a water-bath. The mixture is stirred overnight at room temperature and 700 parts ether are added. The precipitated triethylamine hydrochloride is filtered off and washed with ether. The combined organic layers are washed with 100 parts water 4 times, dried over sodium sulfate and evaporated. The residue, together with 55.2 parts formic acid and 540 parts xylene is refluxed for about 3 hours. (Reaction vessel is provided with reflux-condensor and water seperator). After the calculated amount of water is separated, the reaction mixture is cooled, washed with respectively 20% formic acid (3 times), 100 parts water (2 times), sodium bicarbonate solution (once) and again with 100 parts water (2 times). The organic layer is dried over sodium sulfate and evaporated. The oily residue is distilled yielding 206.8 parts dl-N-[(ethoxy-carbonyl)-methyl]-N-[1-(3,4-dimethyl-phenyl)-ethyl] - formamide; B.P. 153–156° C. at 0.4 mm. pressure.

To 29.9 parts of a 50% sodium dispersion in 360 parts tetrahydrofurane is added a solution of 20.8 parts methanol in 45 parts tetrahydrofurane. After the exothermic reaction has subsided the mixture is stirred for about one hour. The reaction mixture is cooled to room temperature and to it is added at once a solution of 160.6 parts dl-N-[(ethoxy-carbonyl) - methyl] - N - [1 - (3,4 - dimethylphenyl)-ethyl]-formamide in 108 parts methyl formate. The whole is stirred overnight whereupon the solvent is distilled off. The residue is divided between 600 parts water and 210 parts diisopropylether. To the aqueous phase are added 136.8 parts concentrated hydrochloric acid and 480 parts methanol. The temperature is raised to 40° C. and kept there for 30 minutes. Then a solution of 90 parts potassium thiocyanate in 200 parts water is added. The whole is stirred overnight at room temperature, during which an oil is precipitated. A small sample of oil is solidified in dibutylether and added to the reaction mixture. The mixture is thoroughly stirred whereupon a semi-solid precipitates. The aqueous layer is decanted and the residue is triturated in methanol. On cooling in ice, the semi-solid solidifies. The solid is filtered off and dried. A sample of 7 parts of the obtained crop is dissolved in 27 parts benzene. Petroleum ether is added until turbid. On adding a few crystals, crystallization takes place. After keeping for 2 hours at room temperature, the formed precipitate is filtered off and dried in vacuo, yielding crude product. This is recrystallized from a mixture of methanol and water, yielding 3 parts pure dl-1-[1-(3,4-dimethyl-phenyl)-ethyl]-2-mercapto - 5-(methoxy-carbonyl)-imidazole; M.P. 136–138° C.

A mixture of 22.4 parts nitric acid (d: 1.4) 40 parts water and 0.5 part sodium nitrite, is stirred and kept at about 35° C. 14.5 parts dl-1-[1-(3,4-dimethyl-phenyl)-ethyl]-2-mercapto-5-(methoxy-carbonyl)-imidazole are added portionwise in the course of 30 minutes. After the addition is complete, the whole is further stirred at room temperature. The formed precipitate is filtered off and dissolved in water. The solution is alkalized by addition of solid sodium carbonate. The mixture is extracted with ether. The extract is dried and 2-propanol, previously saturated with gaseous hydrogen chloride is added to it. The precipitated hydrochloride is filtered off and recrystallized from 24 parts hot 2-propanol. To the solution is added anhydrous ether until turbid. After keeping overnight at room temperature, the formed precipitate is filtered off and dried to yield dl-1-[1-(3,4-dimethyl-phenyl)-ethyl]-5-(methoxy-carbonyl)-imidazole hydrochloride; M.P. 166–167° C.

*Example XI*

To a mixture of 225 parts dl-1-(4-methoxy-phenyl)-ethylamine, 300 parts triethylamine and 150 parts dimethylformamide, are added 183 parts ethyl chloroacetate. (Exothermic reaction: temperature rises to 68° C.). The mixture is cooled to 40° C. in an ice-bath, which is then removed. The mixture is stirred overnight. Then 700 parts anhydrous ether are added. The precipitated triethylamine hydrochloride is filtered off and discarded. The filtrate is washed (4 times) with water, dried and evaporated. To the residue is added a solution of 69 parts formic acid in 900 parts xylene. The separated water is removed by azeotropic distillation. After cooling, the reaction mixture is washed (3 times) with 20% formic acid. It is then neutralized by addition of sodium bicarbonate solution. The organic layer is dried and filtered. The filtrate is evaporated and the residue is distilled in vacuo, yielding dl-N[(ethoxy-carbonyl) - methyl] - N - [1-(4-methoxy-phenyl)-ethyl]-formamide, as an oil with B.P. 190–192° C. at 2 mm. pressure.

24.2 parts of a 50% sodium suspension in benzene is added to 300 parts tetrahydrofurane. Then a solution of 17 parts methanol in 75 parts tetrahydrofurane is added and the obtained mixture is cooled to 0° C. A solution of 132 parts dl-N-[(ethoxy-carbonyl)-methyl]-N-[1-(4-methoxy-phenyl)-ethyl]-formamide and 80 parts methyl formate is added at once. After cooling for 15 minutes, the ice-bath is removed and the whole is stirred overnight. Then the reaction mixture is evaporated and 500 parts water are added. The mixture is washed with ether. The aqueous layer is separated and respectively 110.4 parts concentrated hydrochloric acid and 400 parts methanol are added. The whole is heated to 40° C. and after keeping at this temperature for 15 minutes, a solution of 59 parts potassium thiocyanate in 125 parts water is added. The mixture is stirred overnight. The solid is filtered off and washed with water to yield dl-1-[1-(4-methoxy-phenyl)-ethyl] - 2 - mercapto-5-(methoxy-carbonyl)-imidazole. A sample is recrystallized from a mixture of 40 parts 2-propanol and 100 parts water, yielding dl-1-[1-(4-methoxy - phenyl) - ethyl - 2-mercapto-5-(methoxy-carbonyl)-imidazole; M.P. 139.5–141° C.

To a solution of 13.7 parts nitric acid in 30 parts water, containing 0.2 part sodium nitrite are added portionwise 10 parts dl-1-[1-(4-methoxy-phenyl)-ethyl]-2-mercapto-5-(methoxy-carbonyl)-imidazole. During this addition, the temperature is kept at 33–38° C., by external cooling. The whole is then stirred for about 30 minutes. The reaction mixture is filtered and the filtrate is alkalized by addition of solid sodium carbonate. The whole is extracted with ether and the organic layer is separated. This extract is dried and a saturated solution of gaseous hydrogen chloride in 2-propanol is added to it. The precipitated hydrochloride is recrystallized from a mixture of 32 parts 2-propanol and 210 parts ether, yielding dl-1-[1 - (4 - methoxy-phenyl)-ethyl]-5-(methoxy-carbonyl)-imidazole hydrochloride; M.P. 129.5–130.5° C.

*Example XII*

To a stirred mixture of 138.6 parts dl-1-(2-thienyl)-ethylamine and 100 parts dimethylformamide are added successively 133 parts ethyl chloroacetate and 77 parts triethylamine at a temperature between 30–35° C. and with external cooling. After the addition is complete, the whole is stirred overnight at room temperature. Then there are added 800 parts anhydrous ether, whereupon a solid precipitate is filtered off (mainly triethylamine hydrochloride). The filtrate is washed four times with 100 parts water, dried over sodium sulfate and evaporated, yielding dl - N - [(ethoxy-carbonyl) - methyl] - 1 - (2 - thienyl)-ethylamine as an oily residue. This fraction is refluxed for 3 hours together with 55.2 parts formic acid and 480 parts xylene (during this reaction about 10 parts water are separated). After cooling the reaction mixture is washed successively with 3× 100 parts formic acid 20%, 2× 100 parts water, 1× 100 parts sodium hydrogen carbonate solution and 2× 100 parts water. The organic layer is dried over sodium sulfate and evaporated. The oily residue is distilled in vacuo, yielding dl-N-[(ethoxy-carbonyl)-methyl] - N - [1 - (2 - thienyl)-ethyl]-formamide; B.P. 145–148° C. at 0.5 mm. pressure.

To 29.9 parts of a 50% sodium-benzene dispersion in 400 parts tetrahydrofurane is added slowly a solution of 20.8 parts methanol in 50 parts tetrahydrofurane. After the addition is complete, the whole is stirred for one hour at room temperature. Then the mixture is cooled to 15° C. and there are added at once 147.2 parts dl-N-[(exthoxy-carbonyl) - methyl] - N-[1-(2-thienyl)-ethyl]-formamide and 108 parts methylformate (exothermic reaction: temperature rises to 33° C.) The whole is further stirred overnight at room temperature. The solvent is evaporated. The oily residue is divided between 600 parts water and 160 parts diisopropylether. To the aqueous phase are added 400 parts methanol and 114 parts concentrated hydrochloric acid and the whole is stirred for 30 minutes at 40° C. While maintaining this temperature there is added a solution of 90 parts potassium thiocyanate in 200 parts water. After stirring overnight a white solid is precipitated which is filtered off and dried, yielding crude dl - 1 - [1-(2-thienyl)-ethyl]-2-mercapto-5-(methoxy-carbonyl)-imidazole. A sample of this fraction is recrystallized from a mixture of 28 parts methanol and 5 parts water, yielding dl-1-[1-(2-thienyl)-ethyl]-2-mercapto-5-(methoxy-carbonyl)-imidazole; M.P. 162–164° C.

To a mixture of 22.4 parts nitric acid (d=1.4), 40 parts water and 0.5 part sodium nitrite are added portionwise 13.4 parts dl-1-[1-(2-thienyl)-ethyl]-2-mercapto-5-(methoxy-carbonyl)-imidazole, while maintaining a temperature between 32–35° C. After the addition is complete, the whole is stirred for 30 minutes at room temperature. To the red coloured solution is added solid sodium carbonate and the whole is extracted with ether. The extract is dried over magnesium sulfate, filtered, diluted with 48 parts acetone and then there is added 2-propanol which is previously saturated with gaseous hydrogen chloride. The precipitated solid salt is filtered off, washed with acetone and further recrystallized from a mixture of 16 parts methanol and 64 parts anhydrous ether, yielding dl-1-[1-(2-thienyl)-ethyl]-5-(methoxy-carbonyl)-imidazole hydrochloride; M.P. 135.5–138° C.

Example XIII

A mixture of 58 parts dl-1-(1-phenyl-ethyl)-5-(methoxycarbonyl)-imidazole hydrochloride and 557 parts concentrated hydrochloric acid is stirred and refluxed overnight. The reaction mixture is boiled with activated charcoal. The mixture is filtered and the filtrate is evaporated. The solid residue is washed with acetone and filtered off again. This product is dissolved in a small volume of water and the solution is alkalized with a concentrated sodium hydroxide solution; pH±7. The precipitate is washed with water, dried and recrystallized from 25 parts water. After keeping for 4 hours at room temperature, the solid is filtered off, washed with alcohol and ether, and dried in vacuo, yielding dl-1-(1-phenyl-ethyl)-5-carboxyimidazole; M.P. 187–189° C.

A mixture of 64 parts dl-1-(1-phenyl-ethyl)-5-carboxyimidazole and 240 parts thionylchloride is stirred and refluxed for about 2 hours. After cooling there are added 500 parts diisopropylether, whereupon a solid precipitate is formed. It is filtered off and dried, yielding dl-1-(1-phenyl - ethyl)-5-(chloro-carbonyl)-imidazole hydrochloride; M.P. 161–163° C. (dec.).

Example XIV

A mixture of dl-1-(1-phenyl-ethyl)-5-(chlorocarbonyl)-imidazole hydrochloride (prepared in the usual manner from 5 parts of the carboxylic acid) and 32 parts absolute ethanol is stirred and refluxed for 5 hours. The reaction mixture is then evaporated and the oily residue, which resists crystallization, is dissolved in water. The obtained solution is alkalized by addition of sodium bicarbonate and the whole is extracted with ether. The extract is dried over magnesium sulfate and filtered. To this solution is added a saturated solution of gaseous hydrogen chloride in 2-propanol. On scratching the precipitated oil, a solid is obtained. This is purified by dissolving it in a small volume of hot 2-propanol and adding dry ether until the solution turns turbid. On cooling, a solid is precipitated. This is filtered off and dried to yield dl-1-(1-phenyl - ethyl)-5-(ethoxy-carbonyl)-imidazole hydrochloride; M.P. 138.5–142° C.

Example XV

A mixture of 3 parts dl-1-(1-phenyl-ethyl)-5-carboxyimidazole and 56 parts thionylchloride is refluxed for 2 hours. After cooling there are added 210 parts anhydrous ether. The formed precipitate is filtered off and added to 24 parts 2-chloro-ethanol. This mixture is refluxed for 1 hour. After cooling, the reaction mixture is evaporated and the residual oil is washed with 70 parts ether. The solvent is decanted and ether is added again to the oily residue. The mixture is extracted with water. The aqueous layer is alkalized (pH: 10) and extracted with ether. The extract is dried and 2-propanol, previously saturated with gaseous hydrogen chloride is added, whereupon an oil is precipitated. After keeping a few days at room temperature, the oil solidifies and the solid is filtered off and recrystallized from a mixture of 4 parts 2-propanol and 14 parts ether, to yield dl-1-(1-phenyl-ethyl)-5-(2-chloro-ethoxy-carbonyl)-imidazole hydrochloride hemihydrate; M.P. 83.5–85° C.

Example XVI

A mixture of 4.6 parts dl-1-(1-phenyl-ethyl)-5-carboxyimidazole and 48 parts thionylchloride is refluxed for about 2 hours. After cooling there is added anhydrous ether. The formed precipitate is filtered off and washed on the filter with anhydrous ether. The filtercake is added to 20 parts n-propanol and the mixture is refluxed for 2 hours. The reaction mixture is evaporated in vacuo. The residue is divided between 105 parts anhydrous ether and 20 parts 10 N sodium hydroxide solution. The organic solution is washed with water, dried over magnesium sulfate, filtered and a saturated solution of gaseous hydrogen chloride in 2-propanol is added to the filtrate. The precipitated oily hydrochloride solidifies on scratching; the solid is filtered off and dissolved in a small volume of n-propanol. Anhydrous ether is added to this solution and after cooling, the formed precipitate is filtered off. It is recrystallized by dissolving in 2-propanol, previously saturated with gaseous hydrogen chloride and addition of anhydrous ether to the solution. After cooling, the formed precipitate is filtered off and dried in vacuo at 40° C., yielding dl-1-(1-phenyl-ethyl)-5-(propoxy-carbonyl)-imidazole hydrochloride; M.P. 156–157° C.

Example XVII

A solution of 4 parts dl-1-(1-phenyl-ethyl)-5-(chlorocarbonyl)-imidazole hydrochloride in 24 parts allyl alcohol is stirred and refluxed for 3 hours. After cooling the reaction mixture, the excess allyl alcohol is evaporated in vacuo. On addition of 10 parts sodium hydroxide 5 N in 50 parts water a two-phase system is formed, from which the free base is extracted with ether. The organic layer is dried and then there is added 2-propanol which is previously saturated with gaseous hydrogen chloride. The solid salt is filtered off and recrystallized from a mixture of 2-propanol and diisopropylether, yielding dl-1-(1-phenyl-ethyl)-5-(allyloxy-carbonyl)-imidazole hydrochloride; M.P. 134–136° C.

Example XVIII

A mixture of 8 parts dl-1-(1-phenyl-ethyl)-5-(chlorocarbonyl)-imidazole hydrochloride and 70 parts propargyl alcohol is stirred and refluxed for 2 hours. After cooling the solvent is evaporated in vacuo. To the residue is added 75 parts water. The whole is washed with ether, which removes colored impurities. The aqueous phase is alkalized with sodium hydroxide solution and then extracted with ether. The organic layer is dried and evaporated. The oily residue solidifies on scratching in petroleum ether, yielding crude dl-1-(1-phenyl-ethyl)-5-(2-propynoxy-carbonyl)-imidazole. This crop is recrystallized from a mixture of 24 parts benzene and 16 parts petroleum ether, yielding dl-1-(1-phenyl-ethyl)-5-(2-propynoxy-carbonyl)-imidazole; M.P. 92–93° C.

Example XIX

A mixture of 3 parts dl-1-(1-phenyl-ethyl)-5-carboxyimidazole and 48 parts thionylchloride is refluxed for 2 hours. After cooling there is added anhydrous ether. The formed precipitate is filtered off and added to 32 parts 2-propanol. This mixture is refluxed for about 2 hours. The reaction mixture is evaporated in vacuo. To the solid residue is added a 10 N-solution of sodium hydroxide and the whole is extracted with ether. The organic layer is separated, dried over magnesium sulfate and filtered. To the filtrate is added 2-propanol, previously saturated with gaseous hydrogen chloride. The precipitated hydrochloride is filtered off again and recrystallized by dissolving in 2-propanol. Anhydrous ether is added until a turbid solution is obtained. After cooling to room temperature the precipitate is filtered off, yielding crude dl-1-(1-phenylethyl) - 5-(2-propoxy-carbonyl)-imidazole hydrochloride. This crop is recrystallized once more in the same manner, yielding dl-1-(2-phenyl-ethyl) - 5-(2-propoxy-carbonyl)-imidazole hydrochloride; M.P. 192–193.5° C.

*Example XX*

5 parts dl-1-(1-phenyl-ethyl) - 5 - (chloro-carbonyl)-imidazole hydrochloride are added to 42 parts butanol which were previously saturated with gaseous hydrogen chloride. The mixture is stirred and refluxed for 2 hours. After cooling, the solvent is evaporated. To the residue are added 75 parts water and this aqueous mixture is alkalized with sodium hydroxide 5 N and further extracted with ether. The extract is dried over sodium sulfate and then there is added 2-propanol which is previously saturated with gaseous hydrogen chloride. The precipitated salt is filtered off (hygroscopic) and recrystallized immediately from a mixture of 8 parts 2-propanol and 80 parts diisopropylether, to yield dl-1-(1-phenyl-ethyl) - 5 - (butoxy-carbonyl)-imidazole hydrochloride; M.P. 139–141.5° C.

*Example XXI*

A mixture of 27 parts dl-1-(1-phenyl-propyl)-5-(methoxy-carbonyl)-imidazole and 70 parts sodium hydroxide 10 N is stirred and refluxed for one hour. Then there is added an equal volume of water. The whole is washed with ether. The aqueous layer is separated, acidified with diluted hydrochloric acid until a pH of about 7 is obtained, whereupon an oil is precipitated which solidifies on scratching in 4-methyl-2-pentanone. This solid is filtered off and dried, yielding dl-1-(1-phenyl-propyl)-5-carboxy-imidazole, melting at 85–95° C. This crude product, together with 80 parts thionylchloride, is stirred and refluxed for one hour. After cooling to room temperature, there is added anhydrous ether. The formed precipitate is filtered off and dried, to yield dl-1-(1-phenyl-propyl)-5-(chloro-carbonyl) - imidazole hydrochloride. A mixture of 5 parts of this crude salt, together with 40 parts absolute ethanol is stirred and refluxed for one hour. After cooling, the reaction mixture is evaporated. To the residue are added 20 parts water. The whole is alkalized with sodium hydroxide 10 N until a pH of 10 is obtained, and then extracted with ether. The organic layer is dried over magnesium sulfate, filtered and to the filtrate is added 2-propanol which is previously saturated with gaseous hydrogen chloride. The precipitated solid is filtered off and recrystallized as follows: this crop is dissolved in a small volume of warm absolute ethanol. To the obtained solution is added anhydrous ether and the whole is filtered. More anhydrous ether is added to the filtrate, until a turbid solution is obtained. After keeping for 2 hours at room temperature, the solid is filtered off and dried in vacuo, yielding dl-1-(1-phenyl-propyl) - 5 - (ethoxy-carbonyl)-imidazole hydrochloride; M.P. 169–170.5° C. (dec.)

*Example XXII*

To 30 parts 1-pentanol, previously saturated with gaseous hydrogen chloride, are added portionwise 5 parts dl-1-(1-phenyl-ethyl) - 5 - (chloro-carbonyl) - imidazole hydrochloride. After the addition is complete, the whole is stirred and refluxed for 2 hours. After cooling the reaction mixture is evaporated. The residue is dissolved in 100 parts water. This solution is alkalized with sodium hydroxide 5 N until a pH 10 is obtained and extracted with ether. The extract is dried over magnesium sulfate and there is added 2-propanol previously saturated with gaseous hydrogen chloride. The solid salt is filtered off and recrystallized immediately from a mixture of 8 parts 2-propanol and 80 parts diisopropylether, yielding dl-1-(1-phenyl-ethyl)-5-(pentyloxy-carbonyl) - imidazole hydrochloride; M.P. 139–140° C.

*Example XXIII*

A mixture of 5 parts dl-1-(1-phenyl-ethyl)-5-(chlorocarbonyl)-imidazole hydrochloride in 32 parts 2-methoxyethanol, previously saturated with gaseous hydrogen chloride, is stirred and refluxed for 2 hours. The solvent is evaporated. To the residue are added 100 parts water. This aqueous mixture is alkalized with sodium hydroxide solution and then extracted with ether. The extract is dried and gaseous hydrogen chloride is introduced into it. The precipitated salt is filtered off and recrystallized from a mixture of benzene and diethylether, to yield after drying for some days, dl-1-(1-phenyl-ethyl)-5-[(2-methoxyethoxy) - carbonyl]-imidazole hydrochloride; M.P. 112–114° C.

*Example XXIV*

To a stirred mixture of 166.3 parts dl-1-(2-pyridyl)-ethylamine in 560 parts anhydrous benzene is added successively 137.6 parts triethylamine and 166.5 parts ethyl chloroacetate, at room temperature. After the addition is complete, the whole is stirred overnight and then refluxed for 2 hours. The pecipitated triethylamine hydrochloride is filtered off and the filtrate is evaporated. The oily residue is dissolved in 800 parts anhydrous ether, whereupon a second portion of triethylamine hydrochloride is precipitated. It is filtered off and the filtrate is evaporated. The oily residue is distilled in vacuo, to yield dl-2 - {1 - [(ethoxycarbonyl)-methylamino]-ethyl}-pyridine as an oil; B.P. 108–112° C. at 0.6 mm. pressure, which is further used without further purification.

A mixture of 172 parts dl-2-{1-[(ethoxy-carbonyl)-methylamino]-ethyl}-pyridine, 90.6 parts formic acid and 880 parts xylene is stirred and refluxed for 4 hours. (Note: the reaction vessel is provided with a reflux-condensor and water-separator). Then the xylene is evaporated and the oily residue is distilled in vacuo, yielding dl-N-[(ethoxy-carbonyl)-methyl]-N - [1-(2 - pyridyl) - ethyl]-formamide; B.P. 154–158° C. at 0.4 mm. pressure.

To 35.3 parts of a 50% sodium-benzene dispersion in parts methanol in 50 parts tetrahydrofurane, while stirring and refluxing. After the addition is complete, the whole is stirred for 30 minutes at room temperature, whereafter there is added at once a mixtue of 170.8 parts dl-N-[(ethoxy-carbonyl)-methyl] - N - [1 - (2 - pyridyl)-ethyl]-formamide and 127.5 parts methyl formate. On stirring the mixture at room temperature, one part of the sodium salt is crystallized. It is filtered off (about 89 parts) and the reaction on the ring closure is carried out by using the filtrate of this salt. The filtrate is evaporated. The oily residue is dissolved in 390 parts water. The solution is washed with diisopropylether and further stirred at 40° C. together with 390 parts methanol and 108 parts concentrated hydrochloric acid in the course of 30 minutes. Then there is added a solution of 57.3 parts potassium thiocyanate in 130 parts water. The whole is stirred overnight at room temperature. The methanol is evaporated and the acid aqueous residue is alkalized with ammonium hydroxide whereupon an oil is separated. The aqueous layer is decanted and the oily residue, dl-1-[1-(2-pyridyl)-ethyl]-2-mercapto - 5-(methoxy-carbonyl)-imidazole, is used without further purification for the preparation of the next step.

To a stirred mixture of 44 parts nitric acid ($d=1.37$), 0.7 part sodium nitrite and 80 parts water at a temperature of 35–40° C., is added portionwise 21 parts oily dl-1-[1-(2-pyridyl)-ethyl]-2-mercapto - 5-(methoxy-carbonyl)-imidazole. After the addition is complete, the whole is stirred for 30 minutes at room temperature. The mixture is alkalized by addition of solid sodium carbonate and extracted with benzene. The extract is dried over magnesium sulfate and evaporated. The oily residue is dissolved in 320 parts anhydrous ether and gaseous hydrogen chloride is introduced into this solution. The hydrochloride is precipitated by addition of 2-propanol previously saturated with gaseous hydrogen chloride. The salt is filtered off and recrystallized three times from a mixture of methanol and anhydrous ether, to yield dl-1-[1-(2-pyridyl)-ethyl]-5-(methoxy-carbonyl)-imidazole dihydrochloride; M.P. 183.5–186.5° C.

*Example XXV*

To a mixture of 24.4 parts dl-3-(1-aminoethyl)-pyridine in 80 parts anhydrous benzene is added successively 14.5 parts triethylamine and 24.5 parts ethyl chloroacetate. After the addition is complete, the whole is stirred and refluxed for 5 hours. After cooling the mixture, a thick oil is precipitated. The benzene layer is decanted and the residual oil is first stirred with about 100 parts water followed by extraction of benzene (2×50 parts). The combined extracts are dried over magnesium sulfate and evaporated. The oily residue is distilled in vacuo, yielding dl-3-{1-[(ethoxy-carbonyl)-methylamino]-ethyl}-pyridine; B.P. 100–114° C. at 0.3 mm. pressure.

A mixture of 83.3 parts dl-3-{1-[(ethoxy-carbonyl)-methylamino]-ethyl}-pyridine, 44.2 parts formic acid and 320 parts xylene is stirred and refluxed for 4 hours. After cooling the solvent is evaporated. The oily residue is distilled in vacuo, yielding dl-N-[(ethoxy-carbonyl)-methyl]-N-[1-(3-pyridyl)-ethyl]-formamide; B.P. 174–179° C. at 0.3–0.4 mm. pressure.

To 5 parts of a 50% sodium-benzene dispersion in 62 parts tetrahydrofurane is added a mixture of 3.5 parts methanol in 10 parts tetrahydrofurane at reflux temperature. After stirring the mixture for 30 minutes at room temperature, there is added at once a mixture of 23.6 parts dl-N-[(ethoxy-carbonyl)-methyl]-N-[1-(3-pyridyl)-ethyl]-formamide in 17.7 parts methyl formate. After the addition is complete, the whole is stirred overnight at room temperature. The tetrahydrofuran is evaporated and to the oily residue is added 100 parts water. The aqueous layer is washed with diisopropylether, and further stirred with a mixture of 80 parts methanol and 27 parts concentrated hydrochloric acid. Stirring is continued for 30 minutes at 40° C., whereupon there is added a solution of 14.7 parts potassium thiocyanate in 34 parts water. After the addition is complete, the whole is stirred overnight at room temperature. The clear red-coloured solution is evaporated. The oily residue is treated with ammonium hydroxide solution until a pH of 6–7, whereupon a white solid is obtained. It is filtered off and dried, yielding dl-1-[1-(3-pyridyl)-ethyl]-2 - mercapto - 5 - (methoxy-carbonyl)-imidazole; M.P. 201–202° C.

To a stirred mixture of 22 parts nitric acid (d=1.37), 0.5 part sodium nitrite and 40 parts water are added portionwise 9 parts dl-1-[1-(3-pyridyl)-ethyl]-2-mercapto-5-(methoxy-carbonyl)-imidazole at a temperature of about 30–35° C. After the addition is complete, the whole is further stirred for 30 minutes at room temperature. The mixture is alkalized with solid sodium carbonate and further extracted with a mixture of ether and benzene. The extract is dried over magnesium sulfate and evaporated. The oily residue is dissolved in 240 parts anhydrous ether and to this solution is added 2-propanol, previously saturated with gaseous hydrogen chloride. The precipitated solid is filtered off and recrystallized from a mixture of methanol and anhydrous ether, to yield dl-1-[1-(3-pyridyl)-ethyl]-5-(methoxy-carbonyl)-imidazole dihydrochloride; M.P. 178–189° C. (dec.)

*Example XXVI*

To a stirred mixture of 189 parts dl-1-(4-pyridyl)-ethylamine in 640 parts anhydrous benzene are added successively 130 parts triethylamine and 190 parts ethyl chloroacetate, at room temperature. After the addition is complete, the whole is further stirred for 5 hours at room temperature, followed by refluxing for 5 hours. After cooling the reaction mixture, a thick oil is precipitated. The benzene layer is decanted and set aside. The oily residue is dissolved in 300 parts water. This solution is extracted with benzene. The combined benzene layers are dried over magnesium sulfate and evaporated. The oily residue is distilled in vacuo, yielding dl-4-{1-[(ethoxy-carbonyl)-methylamino]-ethyl}-pyridine; B.P. 111–116° C. at 0.6 mm. pressure.

A mixture of 100 parts dl-4-{1-[(ethoxy-carbonyl)-methylamino]-ethyl}-pyridine, 53 parts formic acid and 400 parts xylene is stirred and refluxed for 4 hours. (Note: the reaction vessel is provided with a reflux-condenser and a water-separator.) After the calculated amount of water is taken up, the xylene is evaporated and the oily residue is distilled in vacuo, to yield dl-N-[(ethoxy-carbonyl) - methyl] - N - [1 - (4 - pyridyl) - ethyl]-formamide; B.P. 175–180° C. at 0.6 mm. pressure.

To 9.8 parts of a sodium-benzene dispersion (50%) in 120 parts tetrahydrofurane is added a mixture of 7 parts methanol in 15 parts tetrahydrofurane at reflux temperature. After stirring the mixture for 30 minutes at room temperature, there is added at once a mixture of 47.2 parts dl - N - [(ethoxy - carbonyl) - methyl] - N - [1 - (4-pyridyl)-ethyl]-formamide and 35.4 parts methyl formate. (Exothermic reaction: temperature rises from 15 to 30° C.) After stirring overnight at room temperature, the tetrahydrofurane is evaporated. The oily residue is dissolved in 200 parts water. This solution is washed with diisopropylether and then stirred for 30 minutes at 40° C. together with a mixture of 160 parts methanol and 54 parts concentrated hydrochloric acid. Then there is added a solution of 29.5 parts potassium thiocyanate in 70 parts water and the whole is stirred overnight at room temperature. The methanol is evaporated and the aqueous residue is treated with ammonium hydroxide solution to a pH of about 6–7, whereupon the product is crystallized. This solid is filtered off and recrystallized from a mixture of methanol and water, yielding dl-1-[1-(4-pyridyl)-ethyl]-2-mercapto-5-(methoxy-carbonyl)-imidazole; M.P. 181–184° C.

To a stirred mixture of 22 parts nitric acid (d=1.37), 0.5 part sodium nitrite and 40 parts water, are added portionwise 10 parts dl-1-[1-(4-pyridyl)-ethyl]-2-mercapto-5-(methoxy-carbonyl)-imidazole at a temperature of 30–35° C. After the addition is complete, the whole is further stirred for 30 minutes at room temperature. The free base is liberated by addition of solid sodium carbonate and the mixture is then extracted with benzene. The extract is dried over magnesium sulfate and evaporated. The solid residue is recrystallized from a mixture of benzene, anhydrous ether and petroleum ether, to yield dl - 1 - [1 - (4 - pyridyl) - ethyl]-5-(methoxy-carbonyl)-imidazole; M.P. 79–80° C.

*Example XXVII*

To a mixture of 1115 parts dl-1-phenyl-ethyl-amine and 950 parts dimethylformamide are added successively 655 parts triethylamine and 1130 parts ethyl chloroacetate. After the addition is complete, the whole is stirred overnight. Then there are added 5600 parts anhydrous ether and the whole is filtered. The filtrate is washed four times with water, dried and evaporated, yielding dl-N-[(ethoxy - carbonyl) - methyl]-1-phenyl-ethylamine. This residue is dissolved in 4800 parts xylene while refluxing and to this solution are added 450 parts formic acid. After boiling for a few hours, the mixture is cooled and washed successively three times with a 20% solution of formic acid, water, sodium hydrogen carbonate solution. The organic layer is then dried, filtered and evaporated. The oily residue is distilled in vacuo, yielding 1600 parts dl-N - formyl-N-[(ethoxy-carbonyl)-methyl]-1-phenyl-ethyl-amine (B.P. 160–170° C. at 0.8 mm. pressure). 30 parts of a sodium dispersion 50% in paraffin oil are added to 450 parts tetrahydrofurane and the whole is slowly heated to a temperature of 40° C., while stirring. While maintaining this temperature (cooling on a water bath is necessary) there are added portionwise 30 parts ethanol.

After the addition is complete, the whole is cooled on an ice-bath and there is added dropwise a solution of 144 parts dl - N - formyl - N-[(ethoxy-carbonyl)-methyl]-1-phenyl-ethylamine in 133 parts ethyl formate. After the addition is complete, the mixture is stirred overnight at room temperature. Then there are added 160 parts ether. After stirring for 5 minutes the mixture is poured into 1500 parts water. The aqueous layer is separated, washed twice with 80 parts diisopropylether and then there is added successively 114 parts concentrated hydrochloric acid and 90 parts potassium thiocyanate in 200 parts water. The mixture is stirred for 24 hours, whereupon an oil is separated. After the addition of 750 parts water, a crystalline product is precipitated. The mixture is further stirred overnight. The solid is then filtered off and recrystallized from a mixture of ethanol and water (1:1 by volume) to yield dl-1-(1-phenylethyl)-2-mercapto-5-(ethoxy-carbonyl)-imidazole; M.P. 129.8–130.8° C.

To a stirred mixture of 140 parts nitric acid ($d=1.37$), 1 part sodium nitrate and 240 parts water are added portionwise 89 parts dl - 1 - (1-phenyl-ethyl)-2-mercapto-5-(ethoxy-carbonyl)-imidazole. After the addition is complete, the whole is stirred for 2 hours at room temperature. The free base is liberated by addition of solid sodium carbonate and the whole is extracted with 120 parts anhydrous ether while heating. The aqueous layer is separated and extracted twice with 80 parts anhydrous ether. The combined extracts are dried over magnesium sulfate, filtered and to the filtrate is added 2-propanol previously saturated with gaseous hydrogen chloride. The precipitated salt is filtered off, dried for two days at 60° C., to yield dl - 1 - (1 - phenyl - ethyl) - 5 - (ethoxy - carbonyl)-imidazole hydrochloride; M.P. 142–142.8° C.

What is claimed is:

1. A compound selected from the group consisting of an imidazole carboxylate having the formula:

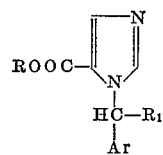

and a therapeutically active non-toxic acid addition salt thereof wherein R is a member selected from the group consisting of lower alkyl, halo-lower alkyl, allyl, 2-propynyl and lower alkoxy-lower alkyl; $R_1$ is lower alkyl; and Ar is a member selected from the group consisting of phenyl, halophenyl, lower alkylphenyl, lower alkoxyphenyl, thienyl and pyridyl.

2. 1 - (1 - phenyl - ethyl) - 5 - (methoxy - carbonyl)-imidazole hydrochloride.

3. 1 - (1 - phenyl - propyl) - 5 - (methoxy - carbonyl)-imidazole hydrochloride.

4. 1 - [1 - (4 - fluoro-phenyl)-ethyl] - 5 - (methoxy-carbonyl)-imidazole hydrochloride.

5. 1 - (1 - phenyl-ethyl) - 5 - (ethoxy-carbonyl)-imidazole hydrochloride.

6. 1 - (1 - phenyl-ethyl) - 5 - (propoxy-carbonyl)-imidazole hydrochloride.

7. 1 - (1 - phenyl-ethyl) - 5 - (allyloxy-carbonyl)-imidazole hydrochloride.

References Cited
FOREIGN PATENTS
1,184,709    7/1959    France.

OTHER REFERENCES
Jones, Jour. Amer. Chem. Soc. vol. 71, pp. 644–7 (1949).

JOHN D. RANDOLPH, *Primary Examiner.*

WALTER A. MODANCE, *Examiner.*

N. TROUSOF, *Assistant Examiner.*

UNITED STATES PATENT OFFICE
CERTIFICATE OF CORRECTION

Patent No. 3,354,173                          November 21, 1967

Erik Fred Godefroi et al.

It is hereby certified that error appears in the above numbered patent requiring correction and that the said Letters Patent should read as corrected below.

Column 4, line 51, and column 10, line 31, for "-methoxy-" each occurrence, read -- -(methoxy- --; column 7, line 10, for "-phenyl-" read -- -phenyl)- --; column 15, line 39, for "161-163° C." read -- 161-263° C. --; column 17, line 3, for "2-phenyl" read -- 1-phenyl --; column 18, line 41, for "parts", first occurrence, read -- 430 parts tetrahydrofurane is added a mixture of 24.5 parts --.

Signed and sealed this 17th day of December 1968.

(SEAL)
Attest:

Edward M. Fletcher, Jr.                          EDWARD J. BRENNER

Attesting Officer                                Commissioner of Patents